March 18, 1969  G. P. DURNEY  3,432,860
TUBULAR CONNECTORS FOR PRESSURE SUIT
Filed May 14, 1964  Sheet 1 of 6

INVENTOR
George P. Durney

BY Donald D. Denton
ATTORNEY

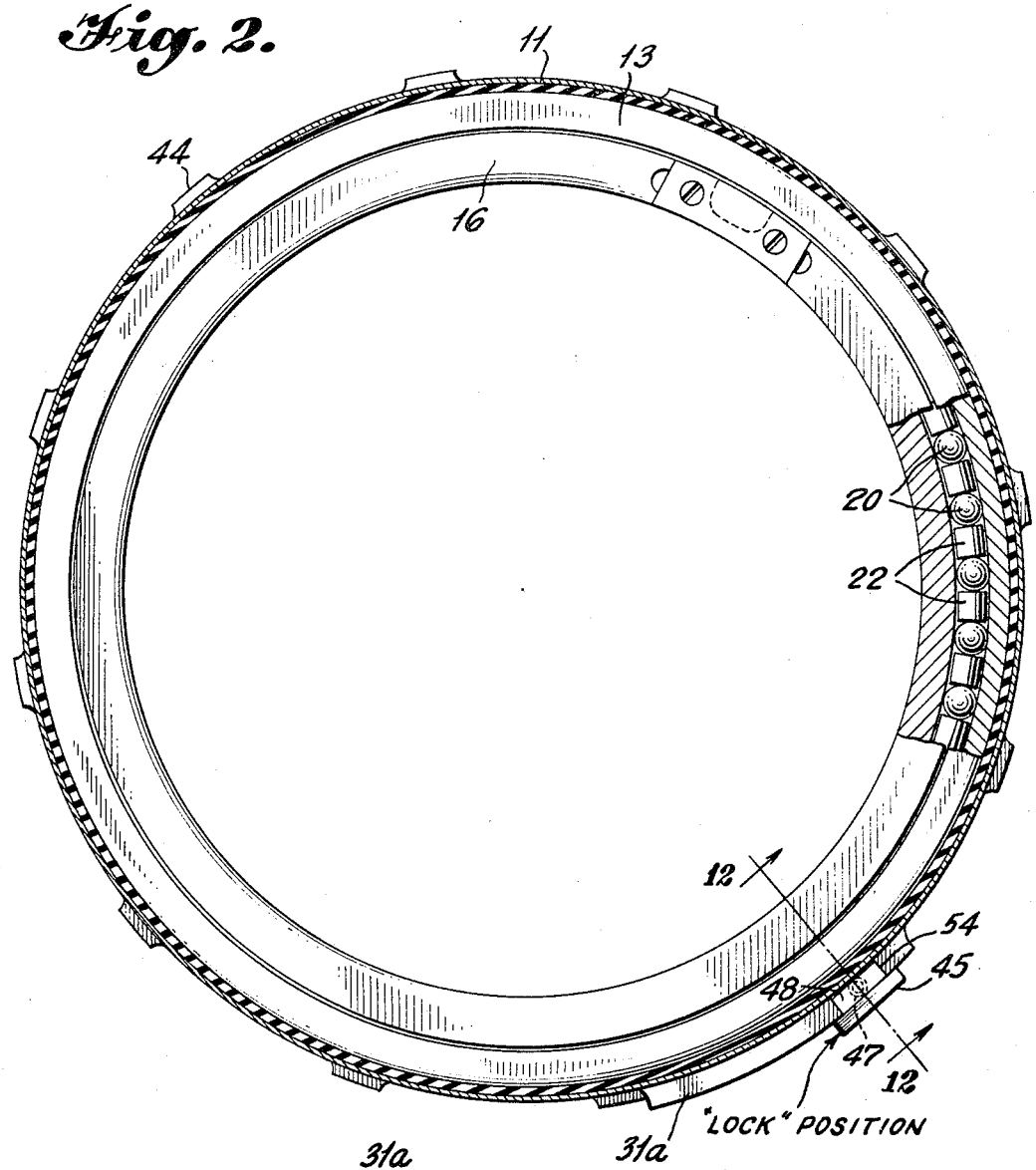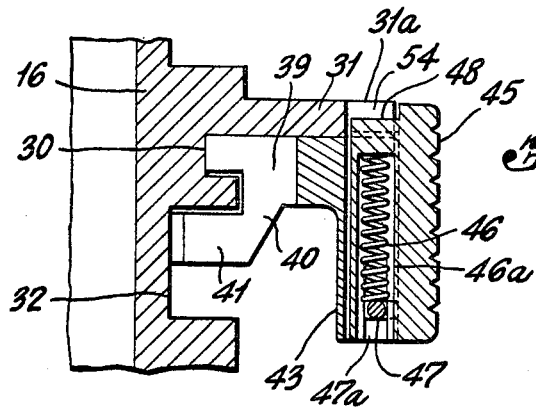

March 18, 1969     G. P. DURNEY     3,432,860
TUBULAR CONNECTORS FOR PRESSURE SUIT Filed May 14, 1964     Sheet 3 of 6

INVENTOR
George P. Durney

BY *Donald D. Denton*

ATTORNEY

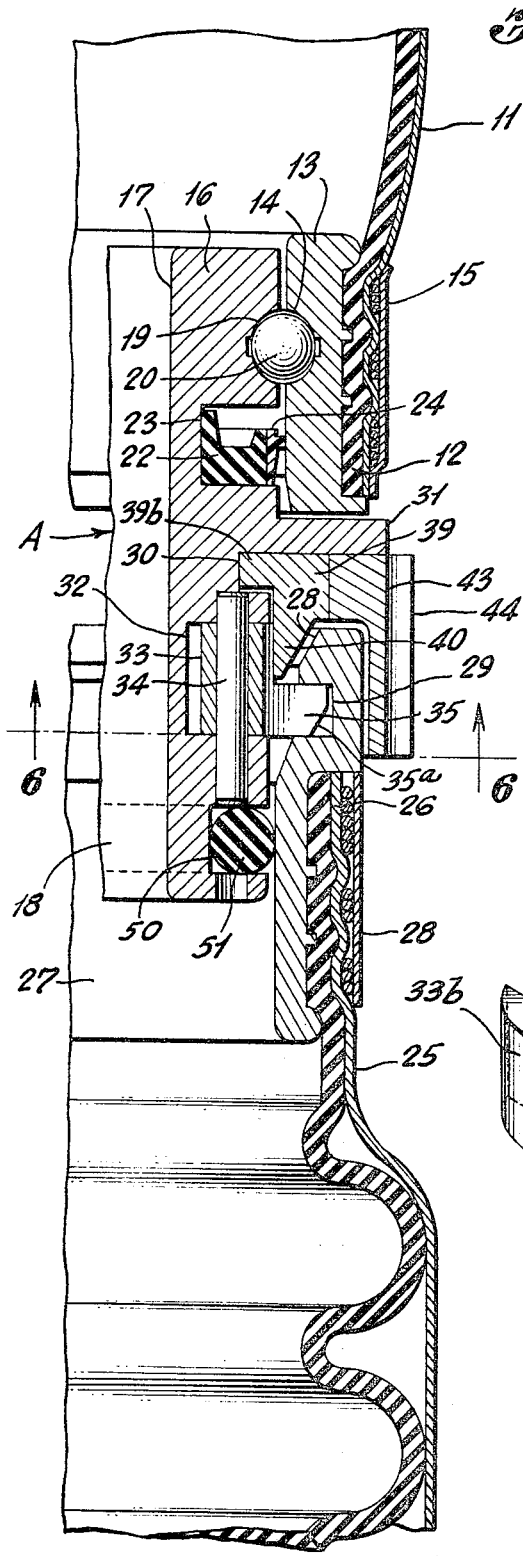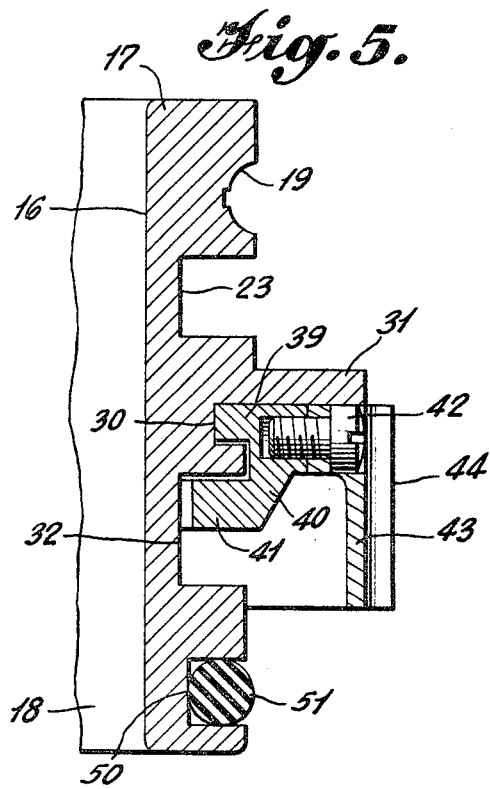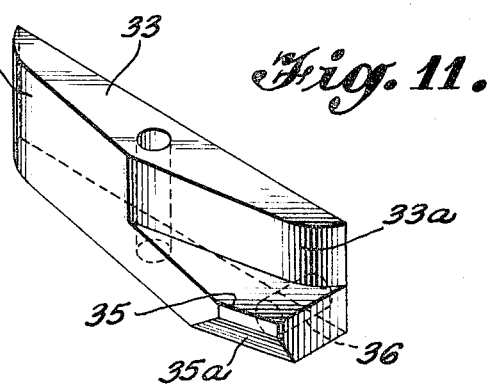

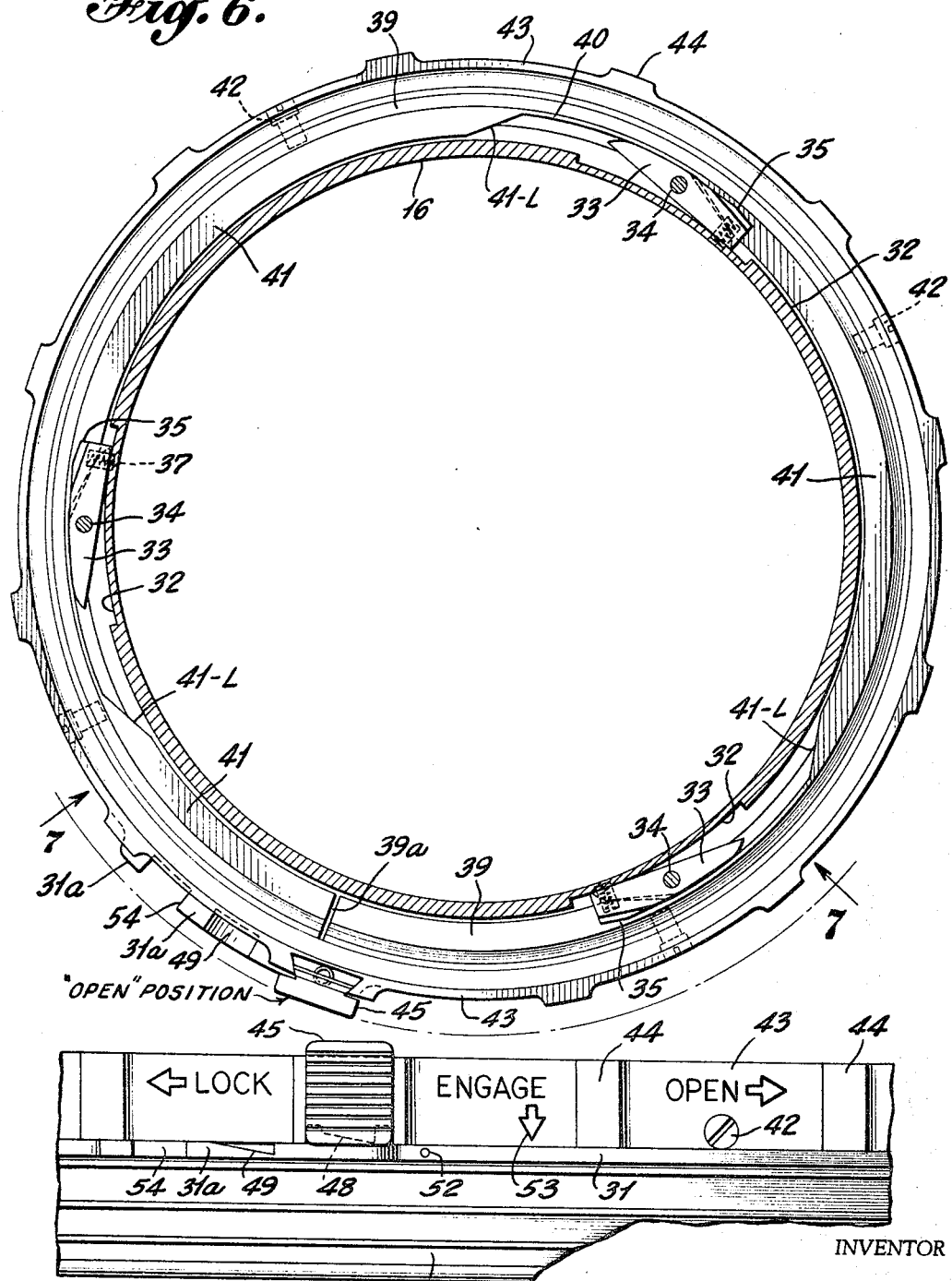

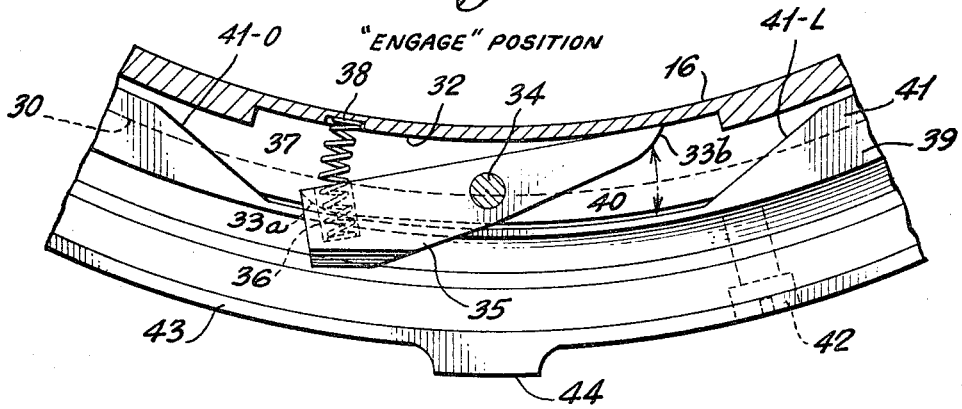
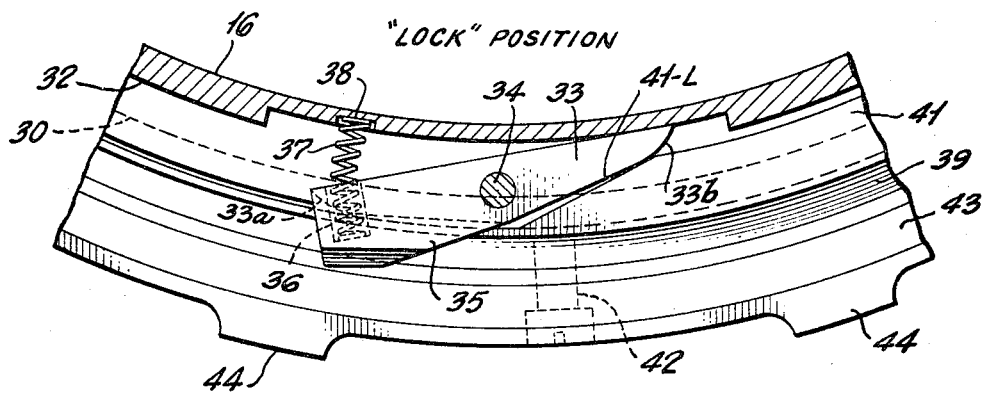
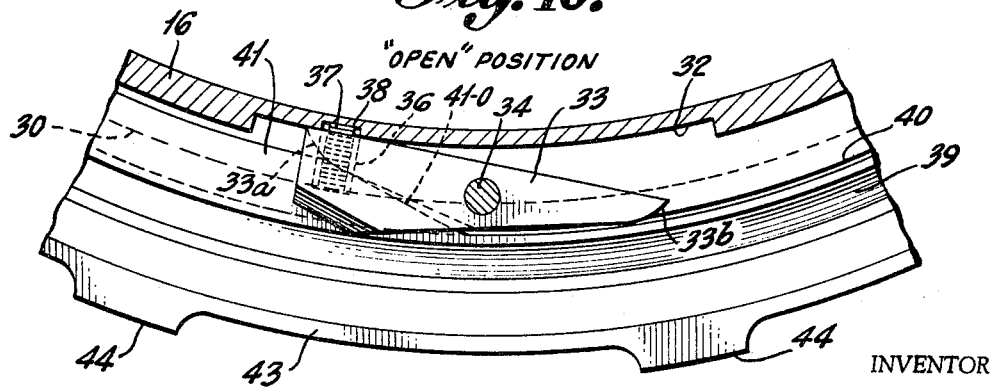

United States Patent Office 3,432,860
Patented Mar. 18, 1969

3,432,860
TUBULAR CONNECTORS FOR PRESSURE SUIT
George P. Durney, Dover, Del., assignor, by mesne assignments, to ILC Industries, Inc., Dover, Del., a corporation of Delaware
Filed May 14, 1964, Ser. No. 367,525
U.S. Cl. 2—2       12 Claims
Int. Cl. A41d 13/00; F16l 37/18

This invention relates to an improvement in pressure suits for high altitude flying. More particularly the invention relates to joints or connector rings for joining structures, such as components of space suits, containing fluid, such as air, under pressure.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

During high altitude flying, the personnel of the craft must be protected from loss of oxygen by the use of inflatable pressure suits. Heretofore many different inflatable pressure suits have been developed, however one important requirement has restricted progress in such development, that is, mobility. To be effective, a pressure suit, besides the basic requirement of affording protection, must provide the wearer with the necessary freedom of motion at the various body joints to perform his complex tasks as well as being comfortable during sitting, standing and walking. Furthermore, with regard to safety the suit must afford the wearer the opportunity for quick and easy removal of same. Furthermore, in the event of ditching, the suit must afford the wearer mobility for survival in water which also may include removal of the suit.

The present invention is suitable as a connector or disconnector for various components of the inflatable pressure suits at various parts of the body. For example, the present invention is suitable as a connector at the neck area of a removable helmet or as a connector at the knee or calf of a separable boot. The present invention is particularly suitable as a connector for the wrist of a separable glove, the wrist being one of the most active body joints. This connector is readily separable and in addition enables the glove to be readily rotated with respect to the sleeve portion of the pressure suit while being sealed from the egress of air and the ingress of water or other undesirable fluids. While it is evident therefore that the connectors of this invention are suitable for use in pressure suits, and especially as a wrist connector, it is readily apparent that the connectors of this invention may also be utilized for other uses than heretofore represented wherein the seal provided for is required. Thus while the present application is directed to a description of a wrist connector, it is to be understood that this invention should not be so-limited in scope.

The rotatable seal or connector of this invention can be formed advantageously from an inter-base ring adapted to fit within an attachment ring having an inwardly extending flange, said attachment ring being secured to the glove to be worn. The inter-base ring can be adapted to rotate with respect to a ring attached to a sleeve opening of the suit by means of ball bearings contained in an area defined by a race in said inter-base ring and by a complementing race in said outer ring secured to the sleeve. Advantageously, the inter-base ring may be secured within the attachment ring by means of a plurality of pawls which are actuated by an annular ring having a cam-like inner periphery. Thus, on contact with the surface of a cam, each of the pawls is pivotably moved so that at least a portion of each of said pawls is positioned under inwardly extending flange of said attachment ring, so as to secure the inter-base ring in contact with said attachment ring. To assure pressure sealing of the two rings together a gasket, such as an O-ring or sealing ring, can be provided so that when the rings are in locking engagement there is provided a pressure seal to maintain pressure within the suit.

In addition to the advantages of the present invention referred to above, other advantages are described below in connection with the specific embodiments shown in the drawings; it being understood that such embodiment is by way of illustration only and not by limitation, in which:

FIGURE 2 is a sectional view taken along line 2—2 of FIGURE 1;

FIGURE 4 is a sectional view taken along line 4—4 of FIGURE 3;

FIGURE 5 is a sectional view taken along line 5—5 of FIGURE 3 with certain of the associated parts illustrated in FIGURE 4 being omitted for the sake of clarity;

FIGURE 6 is a sectional view taken along line 6—6 of FIGURE 4;

FIGURE 7 is a view in developed elevation showing the details of the locking ring in the area indicated by line 7—7 of FIGURE 6;

FIGURE 8 is a cross-sectional view illustrating the pawl in the "engaged" position relative to the locking ring;

FIGURE 9 is a cross-sectional view illustrating the pawl in the "lock" position relative to the locking ring;

FIGURE 10 is a cross-sectional view illustrating the pawl in the "open" position relative to the locking ring;

FIGURE 11 is an isometric view of a pawl as employed in this invention.

FIGURE 12 is a sectional view taken along line 12—12 in FIGURE 2; and

Figure 1:
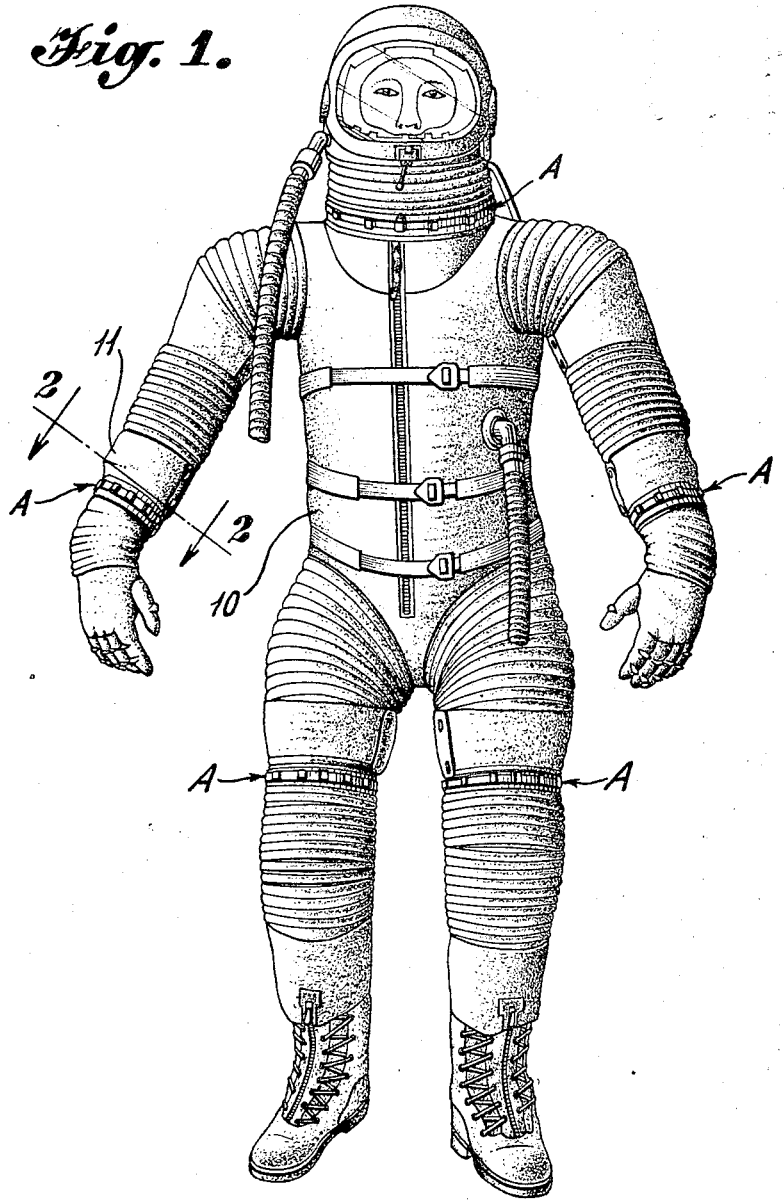
FIGURE 1 is a front view of a pressure suit for high altitude flying showing the connectors positioned at the neck, wrists and knees of the wearer.
Figure 3:
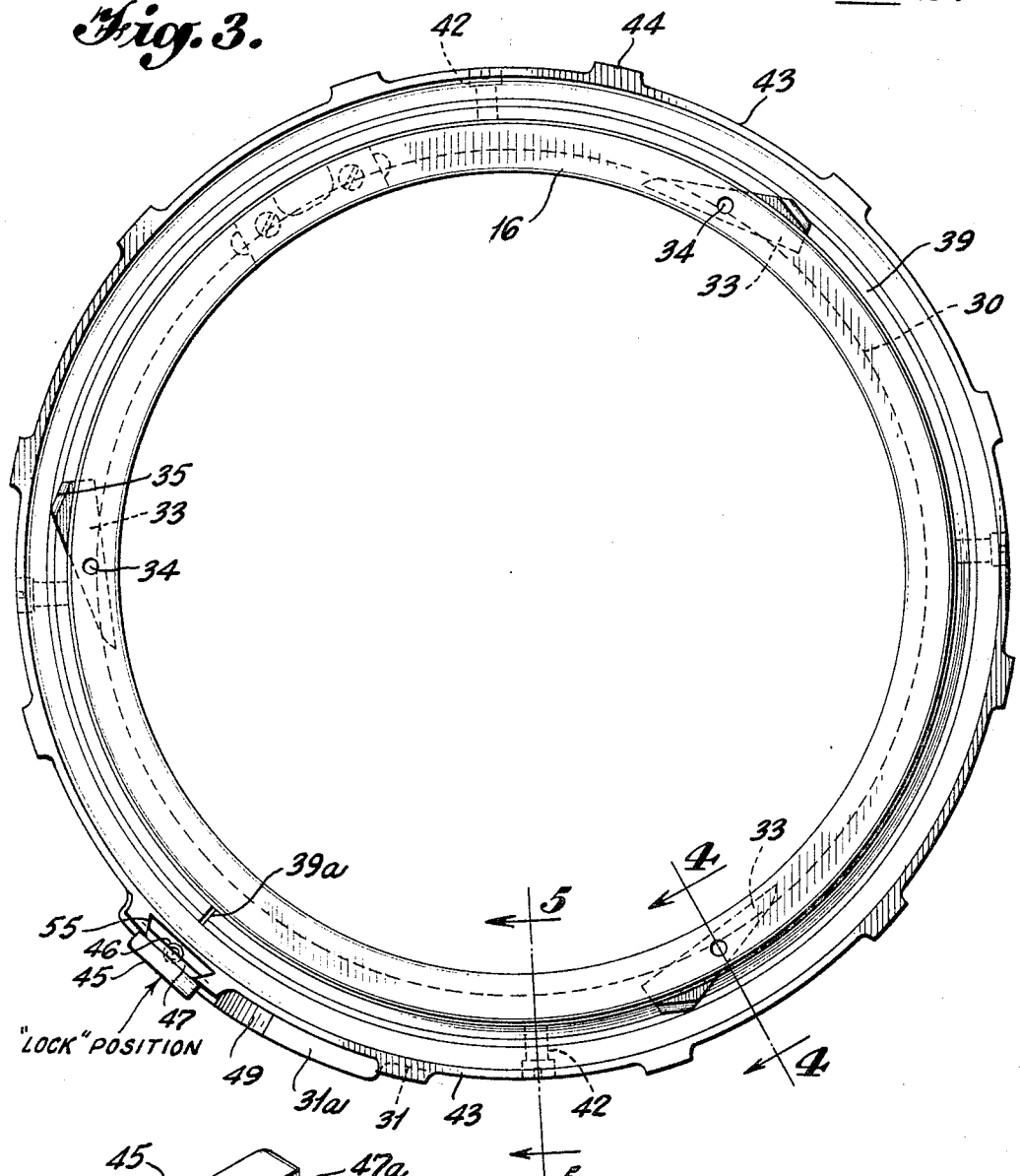
FIGURE 3 is sectional view illustrating the relative relation of a locking ring with the inter-base ring when in the "lock" position.
Figure 13:
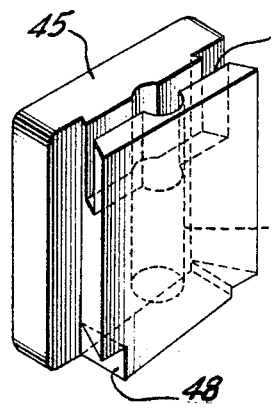
FIGURE 13 is an isometric view of a lock as employed in this invention.

In the drawings, FIGURE 1 shows a pressure flying suit in high altitude flying capable of maintaining the wearer under full pressure when required and incorporating therein the connectors A of this invention. The flying suit has a body portion 10 adapted to cover the legs, body, shoulders and arms of the wearer and, as illustrated, with a sleeve opening 11 therein. As best seen in FIGURE 4, an inner seal ring 13, having a race 14 defined therein, is secured to the marginal edge 12 of the sleeve opening 11 and is integral in the joining of the glove portion of the flying suit to the sleeve opening 11. The inner seal ring 13 can have an outer ring 15 for clamping the marginal edge 12 of the sleeve opening to the inner seal ring. In addition to the outer ring, the marginal edge of the sleeve opening can be secured to the inner seal ring by cementing, wire bands, or the like.

Operatively connected to the inner seal ring 13 is a ring like member, inter-base ring 16, having an upwardly extending portion 17 and a downwardly extending portion 18. The upper portion defines an inner race 19 adapted to receive a plurality of roller elements 20, such as stainless steel ball bearings, and, preferably, stainless steel ball bearings spaced with nylon spacers 21. Said roller elements and spacers ride against the surface of races 14 and 19 so as to allow the inter-base ring to rotate within the inner seal ring 13 in order to form a rotatable seal capable of allowing the glove to rotate about the sleeve portion of the suit while still maintaining pressure in the suit. A resilient annular gasket member 22 is advantageously positioned in groove 23 which is provided in the upper portion of the inter-base ring 16. Said gasket is suitably of any resilient material and is preferably an L-shaped rubber gasket. Positioned around the annular gasket 22 can be an annular sealing element 24 preferably made of polished Teflon having a downwardly depending inner flange and outwardly extending horizontal flange. The sealing element 24 is positioned so that the depending flange contacts the bottom edge of the groove 23, while the extending flange contacts the inner periphery of the inner seal ring 13. In this position rotation of the inter-base ring 16 within the inner seal ring causes the surface of the flange to ride in contact with the surface of the inner seal ring 13 thereby providing a pressure seal when the resilient annular member 22 is expanded by pressure from within the suit.

In accordance with this invention, the glove is provided with a wrist opening 25 which is adapted to join the sleeve portion of the suit. To the marginal edge 26 of the glove's wrist opening 25 is secured an attachment ring 27 which is capable of joining the glove and sleeve portion of the flying suit. Said attachment ring has an annular groove 29 defined in the upwardly extending portion thereof. The attachment ring 27 can also have an outer ring 28 for clamping the marginal edge 26 of the glove to the attachment ring. In addition to the outer ring 28 the marginal edge of the glove can be secured to the attachment ring 27 by means of cementing, wire bands, or the like. The lower corners of the attachment ring 27 as well as the upper corners of the inner seal ring 13 can have a beveled or curved surface so as to eliminate sharp edges pressing against the outer surface of the sleeve or of the glove while they are being worn.

It is contemplated by the present invention that extra mobility may be afforded the wearer by provision of bellows clamped in the manner hereinbefore described to either or both the inner seal ring 13 or the attachment ring 27. The edge of the bellows can also be cemented, or the like, to assure a tight seal to said rings. Advantageously, the bellows can be formed from flexible material such as several plies of rubber and cloth united together. The surface of the bellows can also have a helical indentation to facilitate a bending action through an axis substantially vertical to the convolutions of the helix.

In accordance with this invention, inter-base ring 16 defines an annular groove 30 below the outwardly extending flange 31. Below annular groove 30, inter-base ring 16 also defines a substantially larger annular groove 32. Annular groove 32 is adapted to receive a plurality of pawls 33 which are pivotably mounted therein by means of vertical pin 34. Pawl 33 is suitably substantially triangular in configuration and in accordance herein has at least one vertical planar side surface which faces the inner vertical surface of annular groove 32. Pawl 33 has a lip or projection 35 extending radially outward from said pawl which is employed to operably engage the annular groove 29 of attachment ring 27 in a manner as herein later described. At the lip or projection end of pawl 33 there is provided a cylindrical bore 36 adapted to receive one end of the pawl spring 37, the other end of which is disposed in cylindrical bore 38 in the vertical inner surface of annular groove 32. The arrangement is such that the lip or projection portion 35 of pawl 33 tends to be positioned outwardly but may be pivotally moved by means of force exerted against spring 37 positioned within pawl 33.

Positioned in annular groove 30 and under flange 31 can be an annular cam ring 39. As shown, cam ring 39 is provided with a cut at 39a to allow expansion of said ring so that flange 39b can be inserted into said groove 30. Cam 39 has the configuration of an annular member having a downwardly extending flange 40. Extending inwardly, i.e. toward the annular center, from said flange 40 are provided a plurality of lips 41, the terminal ends of which slope outwardly, i.e. away from the annular center, toward said flange 40 so as to define a plurality of cam-like projections 40–O and 40–L on the inner peripheral edge of said cam. Pawl 33, is substantially triangularly shaped in the region adjacent said lips of the cam ring 39 and is provided with rounded ends 33a and 33b which bear against cam surfaces 41–O and 41–L respectively as shown in FIGURES 6, 8, 9 and 10.

Attached to the outer peripheral edge of said cam 39 by means of securing means, i.e. machine screws 42, is locking ring 43. In this position rotation of the locking ring and the attached cam about the inter-base ring is possible without restriction. The locking ring 43 extends out beyond the outer surface of the body of the connector unit A and its exposed edge may be knurled or, as indicated, provided with a plurality of raised faces 44 so as to facilitate rotation of locking ring 43 about said inter-base ring 16. Accordingly, the ring 43 is suitably engraved with markings, as best seen in FIGURE 7, which identify the various positions to which said locking ring 43 may be moved in the manner which will herein later be described.

When connected, attachment ring 27, having the glove attached thereto, is inserted in an area defined by the lower portion of the inter-base ring 18, the annular cam 39, and locking ring 43. At least the upper portion of attachment ring 27 is so positioned so as to encase the lower portion of the inter-base ring 18. In accordance with this invention, when said attachment ring 27 is inserted within the so-defined area, the locking ring 43 is so adjusted to be in the "engage" position. Upon rotatable movement of said locking ring 43 to the "engage" position, the terminal ends 41–O and 41–L of the lip 41 on annular cam 39 are removed from proximity with pawl 33 so as to allow the spring 37 to distend and assume the "engage" position (see FIGURE 8). It is to be realized that in the "engage" position the spring 37 is the sole force in restricting the pivotal movement of pawl 33.

The upper inner edge of attachment ring 27, above annular groove 29, is beveled at 28 to cooperate with a beveled surface 35a on lip 35 of pawls 33. Thus, pawls 33 are cammed out of the way of the upper flange of annular groove 29 when attachment ring 27 is inserted into the annular space between inter-base ring 16 and locking ring 43; as best seen in FIGURE 4. When the groove 29 is aligned with pawl lips 35 the springs 37 force the pawls into engagement with groove 29 with an audible click. In order to properly position pawls 33, it is obvious that the locking ring 43 must be exactly in the "engage" position. So as to insure the proper position, visual means, i.e., arrow 53 which points to indicator 52 when such position is attained, is provided for. Movement from said position is precluded by use of lock 45 (which is herein later described), and the appendage 48 thereon in conjunction with indent 49 which accommodates said appendage 48.

When the attachment ring is engaged, the locking ring is then rotatably moved to the "lock" position. Upon rotatable movement of the locking ring 43 to the "lock" position, the terminal end 41–L of the lip 41 on the annular cam 39 is then positioned so as to engage the end 33b of the pawl 33 opposite to the spring end portion thereof. Upon such engagement the pawl 33 is secured by terminal end 41–L bearing against pawl end 33b and the pawl lip 35 is fixedly positioned within the groove 29 in attachment ring 27 (see FIGURE 9).

While the attachment ring 27 is secured by means of pawls 33, it is to be realized that rotation of locking ring 43 to the "open" position will cause compression of pawl spring 37 and consequently release of said attachment ring. In the "open" position the terminal end 41–O of the lip positioned on the flange of annular cam 39 is such that it engages the pawl end 33–O and exerts sufficient force thereon so as to compress pawl spring 37 and position the vertical face of pawl 33 against the inner vertical face of the large annular groove 32 defined in the inter-base ring 16. In so positioning pawl 33, the lip 35 on the pawl is retracted from groove 29 so that the attachment ring 27 may be removed. Thus in order to secure locking ring 43 from rotational movement, lock 45 is povided. Lock 45 is affixed on said locking ring 43 by means of a dovetail slot 55 in an extension protruding from said ring and which conforms in configuration to an outwardly extending face 44 of said locking ring. Lock 45 may be depressed by compressive pressure against the lock and hence spring 46 contained in cylindrical bore 46a and affixed by pin 47, positioned in rectangular slot 47a is forced to contract and the lock is thus lowered within dovetail slot 55. In order to position the locking ring so that rotational movement is unfeasible, lock 45 is depressed; locking ring is rotated into "lock" position; and the lock is allowed to resume to its normal position which is dependent on the distended spring 46 contained therein. In this "lock" position appendage 48 positioned on said lock 45 engages a space 54 defined in the outwardly extending face of the inter-base ring 16. Upon engagement of said appendage 48 within said defined space 54, the locking ring 43 is then unable to accomplish rotational movement until the lock 45 is depressed so as to disengage the appendage 48 from the confining space 54.

In order to connect the attachment ring 27 and the glove attached thereto onto the sleeve portion 11 of the space suit with a pressurized seal, annular space 50 is provided in the downwardly extending portion 18 of inter-base ring 16. Said space 50 is adapted to retain annular O-ring 51 which is preferably a silicone-containing material and which is capable of contacting the inner surface of attachment ring 27, thus placing O-ring 51 in sealing engagement with such surface.

In operation, the suit is assembled on the wearer. The glove with its connector is fitted onto the hand. In this position the locking ring is adjusted so as to be in the "engage" position. When the inter-base ring is placed within the attachment ring, the locking ring is subsequently rotated from the "engage" position and to the "lock" position. While adjusting to this position the lock is depressed so as to engage the appendage thereon with the area defined in the locking ring thereby assuring a locked position. Thus, the inter-base ring is in effect locked within the attachment ring with the gasket and sealing element and the O-ring providing a seal between the components of the connector.

When the wrist connector of this invention, as well as any other remaining connections, are placed in sealed engagement the flying suit is then ready to be pressurized. As pressure is introduced into the flying suit, the rubber gasket expands so that the flat side surface of the resilient sealing element contacts the surface of the inner seal ring so as to form a rotatable seal. The glove portion is then free to turn with the upwardly extending portion of the inter-base ring riding on the ball bearings and spacers within the races defined by said inter-base ring and inner seal ring. The rotatable connector arrangement thus seals so as to prevent the egress or ingress of air or fluids and yet provides for a complete range of normal extremity motion.

In the above embodiment the material utilized for the various components thereof is preferably aluminum, although any similar lightweight and yet strong metal may be utilized in the components thereof. Thus, it is to be understood that all components therein are, preferably, aluminum unless otherwise noted.

Although the present invention has been described with particularity to reference to a preferred embodiment, it would be obvious to those skilled in the art, after understanding the invention, that various changes and modifications may be made therein without departing from the spirit and scope of the invention, and the appendant claims should therefore be interpreted to cover such changes and modifications.

What is claimed is:

1. A connector for interconnecting a pair of hollow structures, said connector comprising an attachment ring adapted to be affixed to one of said hollow structures, an inter-base ring adapted to be affixed to the other of said hollow structures, an annular groove defined in an upward extending portion of said attachment ring a plurality of biased attaching pawls, means mounting said pawls on said inter-base ring, and movable means operatively associated with said pawls and movable to three positions on said inter-base ring, said movable means allowing inward and outward movement of said biased pawls in one position, preventing inward movement thereof in a second position and preventing outward movement thereof in a third position whereby when said attachment ring and said inter-base ring are placed in concentric and contiguous relationship, each of said pawls is biased to extend outwardly into the annular groove defined in said attachment ring thereby securing said attachment ring to said inter-base ring in said one position, each of said pawls is locked outwardly in the groove defined in said attachment ring in said second position and each of said pawls is retracted inwardly from the annular groove in said attachment ring thereby allowing said attachment ring to be separated from said inter-base ring in said third position.

2. The connector of claim 1 in which said inter-base ring has an annular groove defined therein, said pawls being pivotally mounted within said annular groove and said movable means is an annular cam.

3. The connector of claim 2 in which said cam is restrained from rotational movement by means for locking said cam in position on said inter-base ring.

4. The connector of claim 1 further including an outer ring and roller elements, said inter-base ring being rotatably mounted within said outer ring on said roller elements, and said outer ring being adapted to be affixed to one of said hollow structures.

5. In an inflatable suit having a glove portion and a sleeve portion, a connector connecting said glove portion to said sleeve portion, said connector comprising an attachment ring affixed to said glove portion, an inter-base ring movably affixed to said sleeve portion, an annular groove defined in an upward extending portion of said attachment ring, an annular groove defined on the outer surface of said inter-base ring, a plurality of biased attaching pawls, means mounting said pawls in the annular groove defined on said inter-base ring, and movable means operatively associated with said pawls and movable to three positions on said inter-base ring, said movable means allowing free inward and outward movement of said biased pawls in one position, preventing inward movement thereof in a second position and preventing outward movement thereof in a third position whereby when said attachment ring and said inter-base ring are placed in concentric and contiguous relationship, each of said pawls is biased to extend outwardly into the annular groove defined in said attachment ring thereby securing said attachment ring to said inter-base ring in said one position, each of said pawls is locked outwardly in the groove defined in said attachment ring in said second position and each of said pawls is retracted inwardly from the annular groove in said attachment ring thereby allowing said attachment ring to be separated from said inter-base ring in said third position.

6. The suit of claim 5 further including an outer ring, ball bearings, and nylon spacers, said inter-base ring being rotatably mounted within said outer ring on said ball bearings, said ball bearings being separated by said nylon spacers, and said outer ring being affixed to said sleeve portion.

7. A rotatable connector comprising an attachment ring, an inter-base ring adapted to fit contiguously within said attachment ring, said inter-base ring being rotatably mounted within an outer ring, and being secured within said attachment ring by a plurality of biased attaching pawls, an annular ring operatively associated with said pawls, said annular ring having cam surfaces on its inner periphery, means mounting said annular ring on said inter-base ring, said annular ring being movable to three positions corresponding to its "engage", "lock" and "open" positions on said inter-base ring, the cam surfaces of said annular ring being spaced from said pawls when said annular ring is in its "engage" position whereby each pawl is freely biased outwardly from said inter-base ring to secure said attachment ring thereto, the cam surfaces of said annular ring contacting said pawls when said annular ring is in its "lock" position whereby said pawls are locked outwardly in engagement with said attachment ring and the cam surfaces of said annular ring also contacting said pawls when said annular ring is in its "open" position whereby said pawls are retracted from said attachment ring thereby allowing said attachment ring to be separated from said inter-base ring.

8. The connector of claim 7 further including a race in said inter-base ring, a complementing race in said outer ring and bearing means, the attachment ring being rotatably mounted on said bearing means contained in an area defined by the race in said inter-base ring and by the complementing race in said outer ring, said bearing means comprising ball bearings separated by nylon spacers.

9. The connector of claim 7 in which an annular gasket and sealing ring is provided between said inter-base ring and said outer ring.

10. The connector of claim 7 in which an O-ring is provided between said inter-base ring and said attachment ring.

11. The connector of claim 7 further including a slot on said inter-base ring, lock means, and means securing said lock means to said annular ring, said lock means having an appendage which engages the slot provided on said inter-base ring.

12. The connector of claim 7 further including means pivotally mounting said pawls on said inter-base ring and resilient meains biasing said pawls outwardly from said inter-base ring.

References Cited

UNITED STATES PATENTS

| | | | |
|---|---|---|---|
| 747,412 | 12/1903 | Getz | 285—320 XR |
| 1,273,896 | 7/1918 | Martin | 285—314 |
| 459,951 | 9/1891 | Warner | 285—87 |
| 832,757 | 10/1906 | Stirzaker | 285—87 |
| 978,957 | 12/1910 | Sutton | 285—315 |
| 2,476,172 | 7/1949 | Williams | 285—317 X |
| 2,817,543 | 12/1957 | Corsette | 285—181 X |
| 2,954,562 | 10/1960 | Krupp | 2—2.1 |
| 3,030,626 | 4/1962 | Shepard | 2—2.1 |

FOREIGN PATENTS 860,216  1/1941  France.

JAMES R. BOLER, *Primary Examiner.*

U.S. Cl. X.R

128—144; 285—314, 320